United States Patent
He

(10) Patent No.: US 6,768,841 B2
(45) Date of Patent: Jul. 27, 2004

(54) INTEGRATED OPTICAL INTERLEAVER/DE-INTERLEAVER

(75) Inventor: Jian-Jun He, Ottawa (CA)

(73) Assignee: MetroPhotonics Inc., Ottawa (CA)

( * ) Notice: Subject to any disclaimer, the term of this patent is extended or adjusted under 35 U.S.C. 154(b) by 50 days.

(21) Appl. No.: 10/097,738

(22) Filed: Mar. 15, 2002

(65) Prior Publication Data

US 2002/0131708 A1 Sep. 19, 2002

Related U.S. Application Data

(60) Provisional application No. 60/276,205, filed on Mar. 16, 2001.

(51) Int. Cl.$^7$ .............................. G02B 6/26; G02B 6/42
(52) U.S. Cl. ........................................ 385/37; 385/31
(58) Field of Search .............................. 385/11, 24, 37, 385/31; 398/87; 250/339.02

(56) References Cited

U.S. PATENT DOCUMENTS

| | | | | |
|---|---|---|---|---|
| 4,736,360 A | * | 4/1988 | McMahon | 398/87 |
| 4,748,614 A | * | 5/1988 | Dammann et al. | 398/87 |
| 4,938,553 A | * | 7/1990 | Maerz et al. | 385/14 |
| 5,002,350 A | | 3/1991 | Dragone | |
| 5,228,103 A | * | 7/1993 | Chen et al. | 385/14 |
| 5,513,289 A | * | 4/1996 | Hosokawa et al. | 385/33 |
| 5,937,113 A | * | 8/1999 | He et al. | 385/11 |
| 6,078,048 A | * | 6/2000 | Stevens et al. | 250/339.02 |
| 6,208,444 B1 | | 3/2001 | Wong et al. | |
| 6,272,270 B1 | | 8/2001 | Okayama | |
| 6,304,692 B1 | * | 10/2001 | Sappey et al. | 385/24 |
| 6,455,842 B1 | * | 9/2002 | Pouteau et al. | 250/227.18 |
| 6,487,019 B2 | * | 11/2002 | Hoose | 359/575 |
| 6,539,149 B1 | * | 3/2003 | Barbarossa et al. | 385/37 |
| 6,574,396 B1 | * | 6/2003 | Dragone | 385/37 |

FOREIGN PATENT DOCUMENTS

DE             1159317 A1 * 11/2001 ............ G02B/5/18

OTHER PUBLICATIONS

Janz et al., "Planar waveguide echelle gratings: an embeddale diffractive element for photonic integrated circuits", 2002, Optica fiber communication converence and exhibit, 2002, pp 69–70.*
He et al. "Monolithic integrated wavelength demultilexer based on a waveguide rowland circle grating in InGaAsP/InP", Apr. 1998, Journal of lightwave technology, vol. 16, No. 4, pp 631–637.*
Erickson et al. "Using a retro–reflecting echelle grating to improve WDM demux efficiency", Aug. 1997, Digest of the IEEE/LEO Summer Topical Meeting 11–15, pp 82–83.*
U.S. patent application Ser. No. 09/799,013, He et al., filed Mar. 6, 2001.
Wavelength Division Multiplexing, A Critical Review, CR71, SPIE Optical Engineering Press, Bellingham, USA, pp. 3–32 (1999) entitled Integrated Planar Waveguide Demultiplexers for High Density WDM Applications by Emil S. Koteles.
FibreSystems Europe, Jun. 2001, article entitled "Etched Gratings get Ready to Roll", pp 75–76.
Introduction to Modern Optics by Grant R. Fowles, Dover Publications Inc., New York (index only), 1975.

* cited by examiner

*Primary Examiner*—Ellen E. Kim
(74) *Attorney, Agent, or Firm*—Freedman & Associates

(57) ABSTRACT

A grating based optical de-interleaver useful over a wide wavelength range is presented. An echelle grating is used as dispersive element. The spectral response of the device is cyclic. The free spectral range of the grating is designed to separate wavelength channels to be de-interleaved. This device, being bi-directional will also operate as an interleaver.

38 Claims, 4 Drawing Sheets

INTEGRATED OPTICAL INTERLEAVER/DE-INTERLEAVER

This application claims benefit from U.S. Provisional Application No. 60/276,205 filed Mar. 16, 2001.

FIELD OF THE INVENTION

This invention relates generally to wavelength division multiplexing and more particularly to an integrated waveguide grating optical device, based on echelle grating technology, capable of interleaving and de-interleaving different wavelength channels.

BACKGROUND OF THE INVENTION

Driven by the growth of the Internet, consumer demand for data transmission bandwidth has quickly surpassed that of voice. To satisfy this demand, optical networks have been deployed all over the world. The amount of information that can be transmitted on a single fibre optic cable is typically boosted by multiplexing multiple wavelengths on a single optical fibre, allowing it to carry as much data as multiple fibres, each propagating an optical signal at a specific wavelength. This process is referred to as Wavelength Division Multiplexing (WDM), or, in cases when 16 or more wavelength channels are combined, as Dense Wavelength Division Multiplexing (DWDM). This technique allows many different wavelengths of light propagate simultaneously along an optical fibre. Since the combined wavelengths support predetermined channel spacing, the resulting multiplexed signal is also referred to as a channelized signal.

At present, a variety of technologies have been developed that support DWDM data transmission, including: thin film filters, fibre Bragg gratings, integrated waveguide demultiplexers based on phased Arrayed Waveguide Gratings (AWG), and Echelle Gratings (EG). The latter two techniques are optionally used in grating-on-a-chip spectrometers. Integrated devices have many advantages over conventional optical components such as compactness, reliability, reduced fabrication and packaging costs, high-volume manufacturability, and potential monolithic integration with a variety of active devices.

AWGs are often employed for multiplexing/de-multiplexing tasks. An optical waveguide device to achieve this task is for example described in U.S. Pat. No. 5,002,350 to Dragone, issued Mar. 26, 1991, and these techniques are constantly extended and improved, as for example illustrated in U.S. Pat. No. 6,272,270 to Okayama, issued Aug. 7, 2001.

One parameter used in describing the channel response of AWG and EG techniques is the spectral finesse. The fine spectral finesse, which is beneficial for large channel count devices, is often difficult to achieve, and consequently, conventional optical components that have high spectral finesse tend to be quite costly. A solution to this problem is found in the common practice of de-interleaving the multiplexed optical signal. De-interleaving a wavelength multiplexed optical signal converts the multiplexed single signal into two or more signals, each containing optical signals corresponding to certain predetermined wavelength channels. Typically the optical signals provided by the interleaver correspond to a set of signals having non-adjacent wavelength channels at the input port of the interleaver. For example, given an original wavelength multiplexed optical signal with eight predetermined wavelength channels provided to an interleaver, after de-interleaving channels 0, 2, 4, and 6 are provided to a first output port, whereas channels 1, 3, 5, and 7 are provided to a second output port. As a result, the width of the single wavelength channels is effectively doubled, and the DWDM component demands less stringent requirements on passband width and on slopes of passband edges.

Since the design of a de-interleaver depends on the application wavelength window in which the de-interleaver is sought to operate, a few considerations regarding the wavelength range are in order. Optical amplifiers used in the transmission of WDM or DWDM optical signals are typically chosen to ensure that they support the appropriate wavelength range. Currently the most commonly used amplifiers are Erbium-Doped Fibre Amplifiers (EDFA). The wavelength windows range from 1530 nm to 1565 nm (C-band), and from 1570 nm to 1610 nm (L-band). Each of the wavelength windows can accommodate about 40 channels with 100 GHz (~0.8 nm) spacing, or 80 channels with 50 GHz (~0.4 nm) spacing. A de-interleaver for use in reducing spectral finesse requirements of DWDM components operates within these same bands.

Further, the described optical device performing the task of de-interleaving is bi-directional. This means that this device not only de-interleaves optical signals, but also for interleaves two or more optical signals into one single signal. Therefore, the optical device will be referred to as an interleaver/de-interleaver, and when talking about an interleaver or de-interleaver only, the bi-directionality of the device is implied. The bi-directionality also implies that input ports for interleaving functionality become output ports for de-interleaving functionality, and so forth.

As is well known in the art, a Fabry-Perot etalon is a common optical component used to fulfill the basic functionality of a de-interleaving device. A description of such an etalon can be found in standard textbooks on the subject matter (G. R. Fowles, *Introduction to Modern Optics*, $2^{nd}$ ed., Dover Publications, Inc, New York, 1989). A method of using a Fabry-Perot etalon as a means of separating out odd and even wavelengths from an incoming multiplexed signal is for example illustrated in U.S. Pat. No. 6,208,444 to Wong et al., issued Mar. 27, 2001. However, the major problem associated with a single cavity Fabry-Perot etalon, as well as other types of interference filters, is the narrowness of the peaks. This imposes unacceptably severe tolerances on the optical sources that provide the individual optical signals at specific wavelengths because the peak intensity of the wavelength spectrum provided by the source must accurately correspond to the predetermined wavelength channels in order to avoid attenuation of the optical signal by the etalon.

It would be advantageous to have an optical component that acts as an interleaver/de-interleaver, which does not depend upon conventional, expensive and hard to manufacture techniques of production associated with currently available interleavers. Additionally, it would be advantageous if the optical component is very small, resulting in small package footprint and reduced power consumption. It would be advantageous to provide such a device without requiring the level of channel peak accuracy currently necessary for etalon devices.

OBJECT OF THE INVENTION

It is an object of the invention to provide an integrated interleaver component using echelle grating technology.

SUMMARY OF THE INVENTION

The present invention discloses an optical device comprising: an input port for receiving a multiplexed optical signal, including optical signals wherein each pair of wavelength channels out of a plurality of wavelength channels has a predetermined channel spacing; N output ports, with N>1; and an echelle grating for separating the multiplexed optical signal received at the input port in dependence upon a wavelength, and for providing a plurality of channelized signals to each of the output ports; wherein optical signals corresponding to each of a plurality of optical channels $\alpha \cdot N+1 : a \in \{0.M\}$ are provided to a same first output port, and optical signals corresponding to each of a plurality of optical channels $\alpha \cdot N+2 : a \in \{0.M\}$ are provided to a same second output port, M being a natural number, $M \geq 1$.

The invention also describes an optical device comprising: an input port for receiving a multiplexed optical signal, including optical signals within a same industry standard communication band wherein each pair of wavelength channels within the industry standard communication band has a predetermined channel spacing; a first output port; a second output port; and an echelle grating for separating the multiplexed optical signal received at the input port in dependence upon a wavelength, and for providing a plurality of channelized signals to each of the output ports; wherein optical signals corresponding to at least two of the optical channels within the industry standard communication band are provided to the first output port, and at least two other of the optical channels within the industry standard communication band are provided to the second output port.

The present invention further discloses a method of de-interleaving a wavelength multiplexed optical signal comprising the steps of: receiving a wavelength multiplexed optical signal at an input port, said wavelength multiplexed optical signal including optical signals wherein each pair of wavelength channels out of a plurality of wavelength channels has a predetermined channel spacing; separating the wavelength multiplexed optical signal received at the input port in dependence upon wavelength with an echelle grating; and providing a plurality of channelized signals to each of a plurality of N output ports, such that optical signals corresponding to each of a plurality of optical channels $\alpha \cdot N+1 : a \in \{0.M\}$ are provided to a same first output port, and optical signals corresponding to each of a plurality of optical channels $\alpha \cdot N+2 : a \in \{0.M\}$ are provided to a same second output port, M being a natural number, $M \geq 1$.

Additionally, the invention provides a method of de-interleaving a wavelength multiplexed optical signal comprising the steps of: receiving the wavelength multiplexed optical signal at an input port; using an echelle grating separating the wavelength multiplexed optical signal received at the input port in dependence upon wavelength; and, providing a plurality of channelized signals to each of a plurality of output ports such that optical signals corresponding to at least two of the optical channels within an industry standard communication band are provided to the first output port, and at least two other of the optical channels within an industry standard communication band are provided to the second output port.

BRIEF DESCRIPTION OF THE DRAWINGS

Exemplary embodiments of the invention will now be described, in conjunction with the drawings, in which.

DETAILED DESCRIPTION OF THE INVENTION

With reference to the figures, preferred embodiments of the invention are now described. According to the invention, there is provided an interleaver/de-interleaver having an echelle grating with a high diffraction order and a cyclic response cycling over a plurality of wavelength channels within a known application window.

Figure 1:
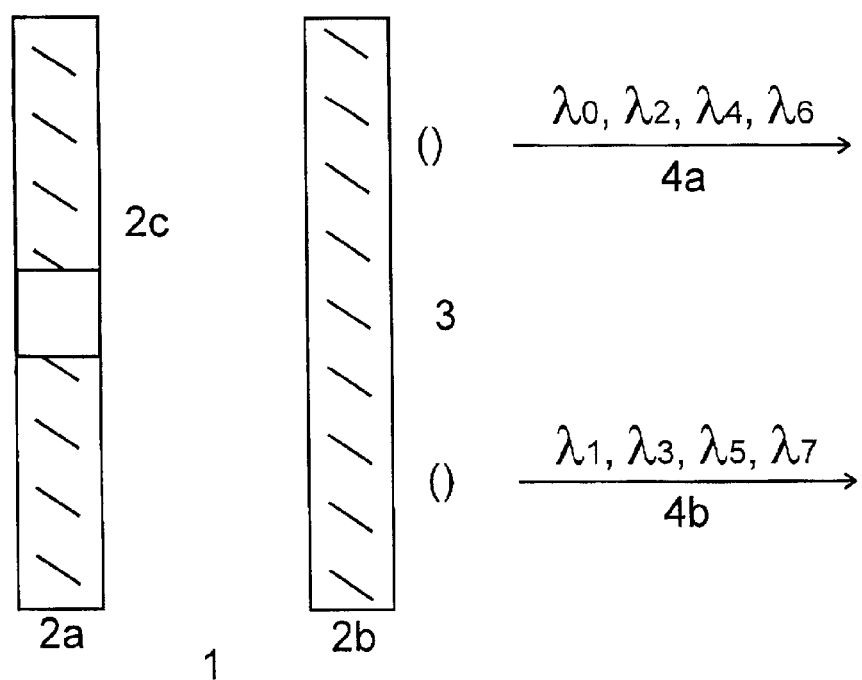
FIG. 1 is a prior art schematic diagram of an etalon interleaver/de-interleaver.

Referring to FIG. 1a, a prior art etalon-based de-interleaver is shown. The etalon comprises an optical cavity 1, disposed between two partially reflective planar surfaces 2a and 2b. The reflective planar surfaces are about 95% reflective. In the surface 2a, there is an input port 2c for receiving interleaved optical signals. The received light, a multiplexed optical signal supporting eight wavelength channels $\lambda_0$ to $\lambda_7$, reflects within the cavity with a portion of the light exiting on the exit face 2b. The exiting light is focused using a lens 3 into each of two optical fibres 4a and 4b. In use, light at wavelengths $\lambda_0$, $\lambda_2$, $\lambda_4$, and $\lambda_6$ are all provided to optical fibre 4a and light at wavelengths $\lambda_1$, $\lambda_3$, $\lambda_5$, and $\lambda_7$ are all directed to optical fibre 4b. Thus, the function of a de-interleaver is achieved, and the channel spacing within the optical signals in the fibres 4a and 4b is twice that in the interleaved signal. Of course, the etalon is designed to support accurate separation of the received optical signal into two de-interleaved optical signals.

Evidently, the above device relies on a dispersive element having a small Free Spectral Range (FSR), such that a first channel is directed to a first port, a second channel to a second port, a third channel to the first port, and so forth. This functionality of the etalon is also illustrated in FIG. 2.

Figure 2:
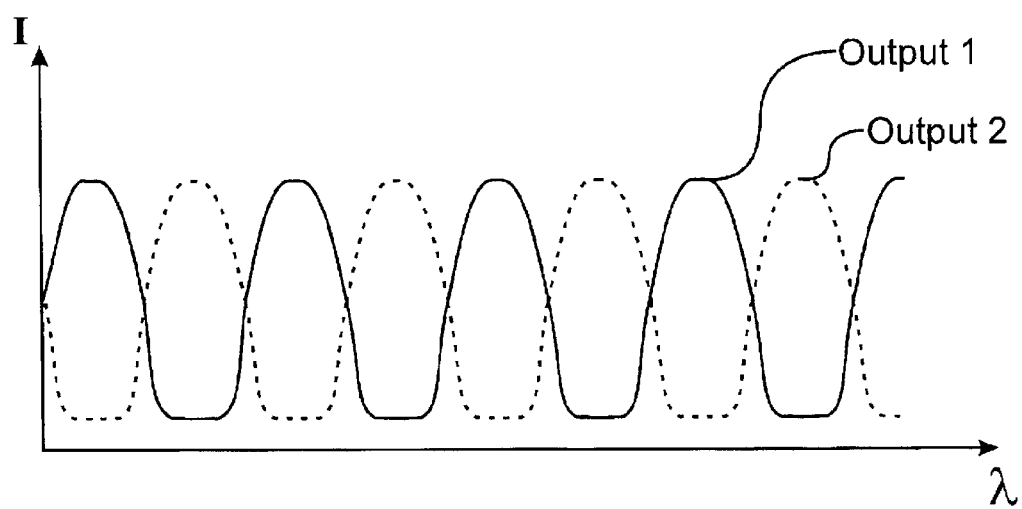
FIG. 2 is a simplified graph of wavelength channels and the wavelength response of an interleaver/de-interleaver.

FIG. 2 shows graphically a spectral response of the prior art device, i.e. the intensity of each channel as a function of wavelength. The abscissa represents the wavelength or range of wavelengths for a given signal channel, whereas the ordinate represents the intensity of the wavelength or signal channel. In this example, the device separates eight wavelength channels within an EDFA application window into two de-interleaved signals. The device separates the signal into two signals each including four signal channels and directs all signals to a corresponding output port with approximately a same power.

It would be desirable to produce an interleaver with a wavelength response according to FIG. 2, which is formed within an integrated substrate. In an optical grating, a light signal is dispersed and then recombined in dependence upon its wavelength. Thus, portions of signals within different wavelength ranges are combined into different output signals. In echelle gratings, this is performed by reflecting the dispersed light off of many facets prior to recombination thereof. Each of these elements introduces a slightly different optical path length for a beam traveling from an input to an output port. In case of an EG, these facets act as a reflecting mirror. In order to perform the interleaving/de-interleaving function, the FSR needs to be equal to a multiple of the channel spacing and is generally very small. A grating with a high diffraction order is therefore needed.

Figure 3:
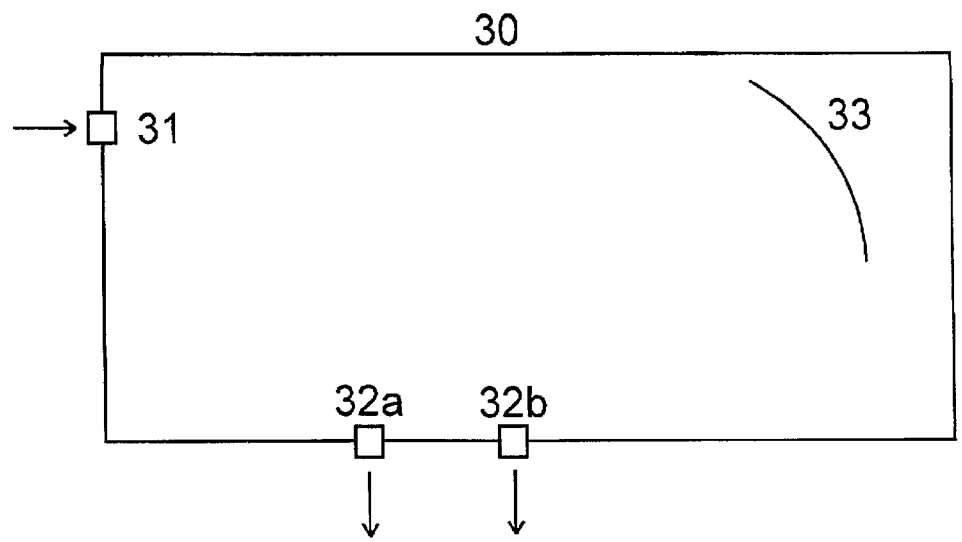
FIG. 3 is a simplified schematic diagram of a first embodiment of the invention featuring a curved reflective diffraction grating.

FIG. 3 illustrates an echelle grating based interleaver/de-interleaver device supporting multiple de-interleaved output ports according to a first embodiment of the invention. In this embodiment, the FSR of the device is substantially equal to the channel spacing multiplied by the number of output ports. In order to de-interleave one signal into two signals, the grating is provided with an FSR having a width of two channel widths. Alternatively stated, the FSR corresponds to a wavelength distance between the first channel in a first pair, and the first channel in an adjacent second pair. All channels within an application window are de-interleaved using the same device. As shown in FIG. 3, an integrated optical component 30 has a single input port 31 and two output ports 32a and 32b. A dispersive element 33 in the form of an echelle grating is optically disposed between the input port 31 and the output ports 32a and 32b for directing light from the input port 31 to the output ports 32a and 32b. The dispersive element has an FSR equal to the width of the two adjacent channels for a de-interleaver. Again, if the input signal light is composed of eight wavelength channels $\lambda_0$ to $\lambda_7$, light at wavelengths $\lambda_0, \lambda_2, \lambda_4$, and $\lambda_6$ is provided to the output port 32a, and light at wavelengths $\lambda_1, \lambda_3, \lambda_5$, and $\lambda_7$ is directed to the output port 32b. The spectral response curve of a device according to a first embodiment of the invention is similar to that illustrated in FIG. 2.

Alternatively, this device is used for de-interleaving pairs of channels, adjacent to each other and separated by a known spacing. In this case, the FSR corresponds to a wavelength distance between the first channel in the first pair, and the first channel in the adjacent second pair. Light at wavelengths $\lambda_0, \lambda_1$, and $\lambda_4, \lambda_5$ is then provided to the output port 32a, whereas light at wavelengths $\lambda_2, \lambda_3$ and $\lambda6, \lambda_7$ is directed to the output port 32b.

Figure 4:
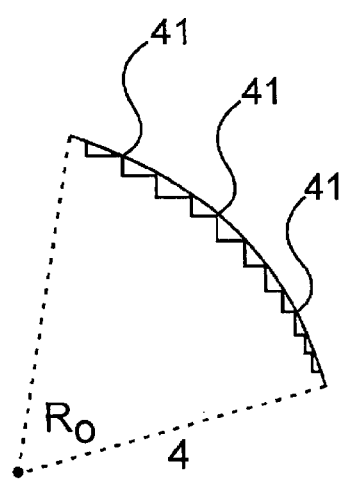
FIG. 4 is a simplified diagram of a portion of an echelle grating for use in providing interleaving/de-interleaving functionality.

Referring to FIG. 4, an echelle grating 4 for use as the dispersive element 33 is shown. The echelle grating comprises a plurality of etched facets 41, each facet having a blaze angle and a planar surface. The facets are arranged along a smooth curve forming an approximately stepwise-curve, the curve having a radius $R_0$.

Figure 5:
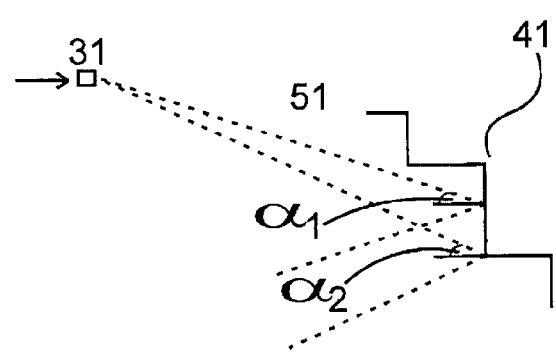
FIG. 5 is a simplified diagram in high magnification of a grating facet.

FIG. 5 illustrates a portion of the echelle grating 4, namely one single facet 41 of the grating, and its two adjacent facets. As is evident, the light signal 51 coming from the input port 31, experiences differences in phase and angle when reflected from the facet 41, depending on where it impinges on the facet surface. Unfortunately, when channel spacing is close together, as it is the case, for example, for a 50 GHz channel spacing, the required size of the grating facets 41 becomes large. As the size of the grating facet 41 increases, errors, due to a varied path length and variations in the angles $\alpha_1$ and $\alpha_2$ to and from each facet surface, become more and more significant. This results in a reduction in diffraction efficiency. Therefore, EG based devices are typically thought to provide only an amount of FSR that is not adequate for interleaver applications.

In order to enhance the efficiency of an EG, certain design modifications to the grating facets are applied. The described variations in path lengths and angles are typical for so-called blazed gratings. The efficiency of these gratings depends on their relative orientation to the incoming light and the output light, implying a blaze condition. When the grating order is high as is required for the interleaver application, the grating facet size is large. A conventional flat facet would result in unequal path lengths for the light beams traveling from the input to the output via different reflecting points on a facet. The corresponding wavelets are not completely constructive. This results in reduced diffraction efficiency. Possible ways to correct for said errors are described in the following.

Figure 6:
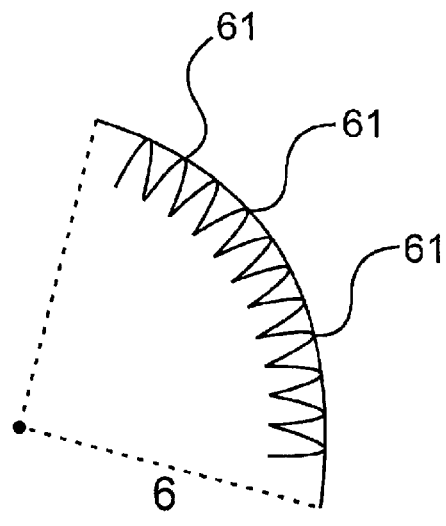
FIG. 6 is a simplified diagram of grating facets with curved geometries.

In FIG. 6, a modified echelle grating 6 with grating facet 61 is shown, wherein the facet is elliptically curved so that the optical path lengths from the input to the output via any point on the facet curve are equal, while the optical path length difference between adjacent grating facets is equal to a multiple of the wavelength.

Figure 7:
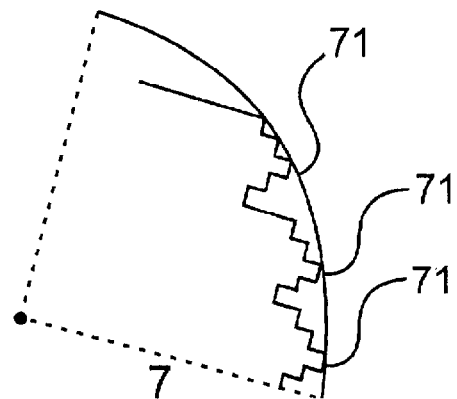
FIG. 7 is a simplified diagram of grating facets with stepwise curved geometries.

Alternatively, FIG. 7 illustrates another echelle grating 7 with facets 71, which have a stepwise-shaped surface, approximating the curved surface. Therefore, Each facet 71 has a plurality of facelets having planar surfaces, the plurality of facelets defining a second other approximately stepwise curve having a different radius of curvature than that of the echelle grating. Introducing a stepwise-curved surface, design and manufacture of the grating is facilitated by eliminating rounded surfaces. By reflecting light from the curved or stepwise-curved surfaces, increased diffraction efficiency results, especially for high order gratings.

Figure 8:
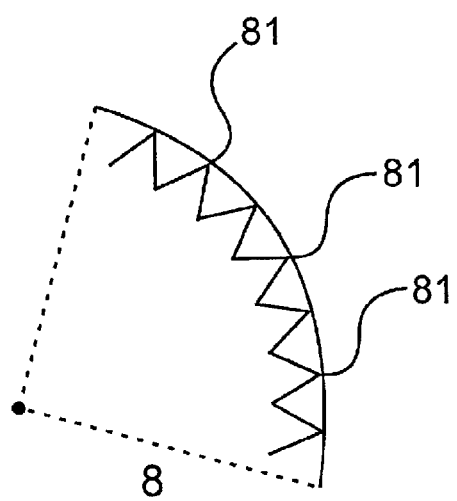
FIG. 8 is a simplified diagram of a grating with two angular faces to improve total internal reflection of light incident thereon.
Figure 9:
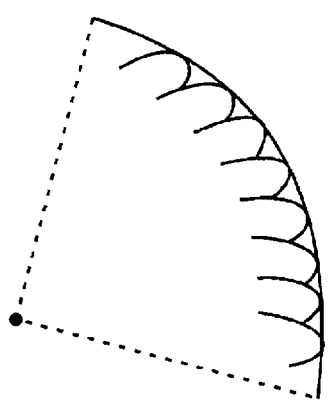
FIG. 9 is a simplified diagram of grating facets similar to those of FIG. 8 but having curved geometries.

Referring to FIG. 8, another grating geometry 8 is shown. Here, the planar facet faces 41 are replaced by a V-groove faces 81 such that light incident on one face of the V-groove is reflected toward the other face of the V-groove, and then reflected off the facet. This way, total internal reflection of light occurs which improves the overall efficiency of the device, without the need for coating each facet with reflective material. Such geometry has similar drawbacks as other planar geometries, and, as shown in FIG. 9, a curved geometry for the planar facets of each V-groove improves the diffraction efficiency for high order gratings. Of course, a stepwise-curved V-groove facet is also possible for implementing the embodiment of FIG. 9.

Figure 10:
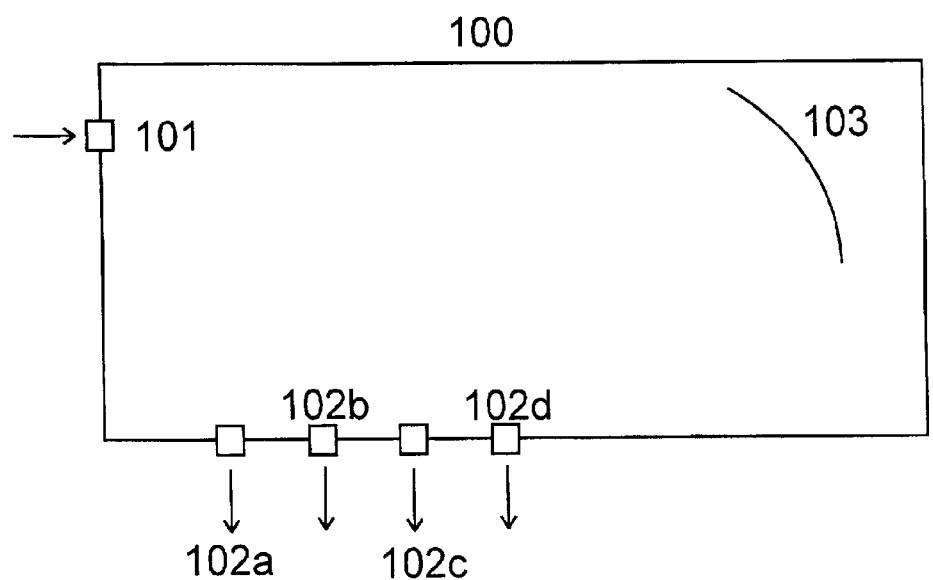
FIG. 10 is a simplified schematic diagram of a second embodiment of the invention featuring a curved reflective diffraction grating.
Figure 11:
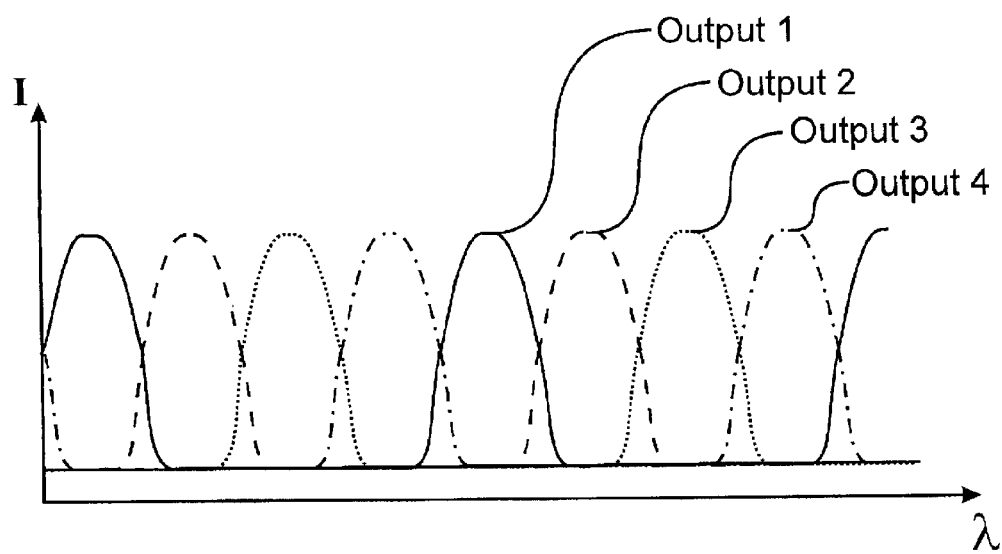
FIG. 11 is a simplified graph of wavelength channels and the wavelength response of an interleaver/de-interleaver according to the second embodiment of the invention.

In a second embodiment of the present invention as shown in FIG. 10, an integrated optical component 100 comprises an echelle grating as dispersive element 103, and input port 101, and four output ports 102a, 102b, 102c and 102d. Light with wavelengths $\lambda_{4m+N-1}$, m being a whole number, is directed to the $N^{th}$ output channel. Thus, light at wavelengths $\lambda_0$ and $\lambda_4$ is provided to the first output port 102a, light at wavelengths $\lambda_1$ and $\lambda_5$ to the second output port 102b, light at wavelengths $\lambda_2$ and $\lambda_6$ to the third output port 102c, and light at wavelengths $\lambda_3$ and $\lambda_7$ is directed to the fourth output port 102d. In FIG. 11, this is illustrated for an incoming signal composed of eight wavelength channels. Since the EG device is bi-directional, it is optionally used as an interleaver or as a de-interleaver. The cyclic behavior of the device according to the present invention is optionally implemented in an integrated interleaver/de-interleaver device, based on a single grating. Such a device operates on the same scientific principles as the multiplexer/demultiplexer disclosed in the U.S. patent application filed on Mar. 6, 2001, entitled "Bidirectional Multiplexer and Demultiplexer Based On A Single Echelle Waveguide Grating" in the name of the present inventors, and incorporated herein by reference.

The small FSR provided by an appropriately designed EG according to the invention allows separation of optical signals within closely spaced wavelength channels. This advantage of EGs makes their use as optical interleavers highly advantageous. In comparison, although AWGs are commonly used for separating DWDM optical signals, they are not advantageous because their sizes are much larger than EGs.

With recent advancements in etching technology, EGs are manufactured with excellent grating wall verticality and smoothness. Thus, producing an EG for this application featuring relatively low insertion loss and a small FSR is reasonable for a person of skill in the art of EG design and manufacturing.

Echelle grating based interleaver components are manufacturable at low cost with high reliability using currently available deposition and processing technology. Integrated optical components are gaining maturity and presently support efficient coupling to optical fibres. Further, an interleaver according to the invention is optionally very small, resulting in small package footprint and reduced power consumption. Preferably, the invention is implemented in an embodiment supporting low on-chip loss, which is improved due to reduced path length of the guided light, and is easily scalable to higher channel counts.

It is noteworthy that the prior art conventional interleaver devices lack many of the advantages inherent to the EG interleaver device of the present invention.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

What is claimed is:

1. An optical device comprising:
   an input port for receiving a multiplexed optical signal, including optical signals wherein each pair of wavelength channels out of a plurality of wavelength channels has a predetermined channel spacing;
   a first and a second output port, each output port disposed at a location different from the input port; and
   an echelle grating for separating the multiplexed optical signal received at the input port in dependence upon a wavelength, and for providing a plurality of channelized signals to each of the output ports;
   wherein optical signals corresponding to each of a plurality of optical channels are provided to one of the first and the second output port such that optical signals corresponding to a plurality of different non-adjacent channels are provided to each of the first and the second output port.

2. An optical device according to claim 1 wherein the echelle grating comprises a plurality of etched facets arranged along a smooth curve forming an approximately stepwise curve.

3. An optical device according to claim 2 wherein ouch facet having a blaze angle and a planar surface.

4. An optical device according to claim 2 wherein each facet having a curved surface.

5. An optical device according to claim 4 wherein the curved surface is substantially an elliptical arc centered at the exit of the input waveguide and the entrance of the output waveguide.

6. An optical device according to claim 2 wherein each facet having a plurality of facelets having planar surfaces, the plurality of facelets defining a second other approximately stepwise curve having a different radius of curvature than that of the echelle grating.

7. An optical device according to claim 2 wherein each facet having two facelet surfaces forming a V-shaped groove such that light incident on one facelet surface of the V-shaped groove is reflected toward the other facelet surface of the V-shaped groove, and then reflected from the facet.

8. An optical device according to claim 7 wherein some facelet surfaces are planar.

9. An optical device according to claim 7 wherein some facelet surfaces are curved.

10. An optical device according to claim 1 wherein the multiplexed optical signal includes optical signals within a same industry standard communication band, each pair of wavelength channels within the industry standard communication bend having a predetermined channel spacing, and wherein optical signals corresponding to at least two of the optical channels within the industry standard communication band are provided to the first output port, and at least two other of the optical channels within the industry standard communication band are provided to the second output port.

11. An optical device comprising:
    an input port for receiving a multiplexed optical signal, including optical signals wherein each pair of wavelength channels out of a plurality of wavelength channels has a predetermined channel spacing;
    at least two output ports, each output port disposed at a location different from the input port; and,
    an echelle grating for separating the multiplexed optical signal received at the input port in dependence upon a wavelength, and for providing a plurality of channelized signals to each of the output ports;
    wherein optical signals corresponding to each of a plurality of optical channels are provided to one of the output ports such that optical signals corresponding to a plurality of different non-adjacent channels are provided to each of the output ports.

12. An optical device according to claim 11 wherein the echelle grating comprises a plurality of etched facets arranged along a smooth curve forming an approximately stepwise curve.

13. An optical device according to claim 12 wherein each facet having a blaze angle and a planar surface.

14. An optical device according to claim 12 wherein each facet having a curved surface.

15. An optical device according to claim 14 wherein the curved surface is substantially an elliptical arc centered at the exit of the input waveguide and the entrance of the output waveguides.

16. An optical device according to claim 12 wherein each facet having a plurality of facelets having planar surfaces, the plurality of facelets defining a second other approximately stepwise curve having a different radius of curvature than that of the echelle grating.

17. An optical device according to claim 12 wherein each facet having two facelet surfaces forming a V-shaped groove such that light incident on one facelet surface of the V-shaped groove is reflected toward the other facelet surface of the V-shaped groove, and then reflected from the facet.

18. An optical device according to claim 17 wherein some facelet surfaces are planar.

19. An optical device according to claim 17 wherein some facelet surfaces are curved.

20. A method of de-interleaving a wavelength multiplexed optical signal comprising the steps of:
    receiving a wavelength multiplexed optical signal at an input port, said wavelength multiplexed optical signal including optical signals wherein each pair of wavelength channels out of a plurality of wavelength channels has a predetermined channel spacing;

separating the wavelength multiplexed optical signal received at the input port in dependence upon wavelength with an echelle grating; and, using the echelle grating providing a plurality of channelized signals to each of a first and second output port, the fat and second output port being disposed at a different location than the input port such that optical signals corresponding to each of a plurality of optical channels are provided to one of the first and the second output port such that optical signals corresponding to a plurality of different non-adjacent channels are provided to each of the first and the second output port.

21. A method of de-interleaving a wavelength multiplexed optical signal according to claim 20 wherein the echelle grating comprises a plurality of etched facets arranged along a smooth curve forming an approximately stepwise curve.

22. A method of de-interleaving a wavelength multiplexed optical signal according to claim 21 wherein each facet having a blaze angle and a planar surface.

23. A method of de-interleaving a wavelength multiplexed optical signal according to claim 21 wherein each facet having a curved surface.

24. A method of de-interleaving a wavelength multiplexed optical signal according to claim 23 wherein each facet having a curved surface, which is substantially an elliptical arc centered at the exit of the input waveguide and the entrance of the output waveguide.

25. A method of de-interleaving a wavelength multiplexed optical signal according to claim 21 wherein each facet having a plurality of facelets having planar surfaces, the plurality of facelets defining a second other approximately stepwise curve having a different radius of curvature than that of the echelle grating.

26. A method of de-interleaving a wavelength multiplexed optical signal according to claim 21 wherein each facet having two facelet surfaces forming a V-shaped groove such that light incident on one facelet surface of the V-shaped groove is reflected toward the other facelet surface of the V-shaped groove, and then reflected from the facet.

27. A method of de-interleaving a wavelength multiplexed optical signal according to claim 26 wherein some facelet surfaces are planar.

28. A method of de-interleaving a wavelength multiplexed optical signal according to claim 26 wherein some facelet surfaces are curved.

29. A method of de-interleaving a wavelength multiplexed optical signal according to claim 20 wherein the multiplexed optical signal includes optical signals within a same industry standard communication band, each pair of wavelength channels within the industry standard communication band having a predetermined channel spacing, and wherein optical signals corresponding to at least two of the optical channels within the industry standard communication band are provided to the first output port, and at least two other of the optical channels within the industry standard communication band are provided to the second output port.

30. A method of de-interleaving a wavelength multiplexed optical signal comprising the steps of:

receiving the wavelength multiplexed optical signal at an input port;

using an echelle grating separating the wavelength multiplexed optical signal received at the input port in dependence upon wavelength; and, using the echelle grating providing a plurality of channelized signals to each of at least two output ports, each of the output ports being disposed at a different location than the input port, such that optical signals corresponding to each of a plurality of optical channels are provided to one of the output ports and such that optical signals corresponding to a plurality of different non-adjacent channels are provided to of the output ports.

31. A method of de-interleaving a wavelength multiplexed optical signal according to claim 30 wherein the echelle grating comprises a plurality of etched facets arranged along a smooth curve forming an approximately stepwise curve.

32. A method of de-interleaving a wavelength multiplexed optical signal according to claim 31 wherein each facet having a blaze angle and a planar surface.

33. A method of de-interleaving a wavelength multiplexed optical signal according to claim 31 wherein each facet having a curved surface.

34. A method of de-interleaving a wavelength multiplexed optical signal according to claim 33 wherein each facet having a curved surface, which is substantially an elliptical arc centered at the exit of the input waveguide and the entrance of the output waveguide.

35. A method of de-interleaving a wavelength multiplexed optical signal according to claim 31 wherein each facet having a plurality of facelets having planar surfaces, the plurality of facelets defining a second other approximately stepwise curve having a different radius of curvature than that of the echelle grating.

36. A method of de-interleaving a wavelength multiplexed optical signal according to claim 31 wherein each facet having two facelet surfaces forming a V-shaped groove such that light incident on one facelet surface of the V-shaped groove is reflected toward the other facelet surface of the V-shaped groove, and then reflected from the facet.

37. A method of de-interleaving a wavelength multiplexed optical signal according to claim 36 wherein some facelet surfaces are planar.

38. A method of dc-interleaving a wavelength multiplexed optical signal according to claim 36 wherein some facelet surfaces are curved.

* * * * *